(12) United States Patent
Minami

(10) Patent No.: US 10,183,499 B2
(45) Date of Patent: Jan. 22, 2019

(54) PRINTER, AND METHOD AND COMPUTER-READABLE MEDIUM FOR THE SAME

(71) Applicant: Brother Kogyo Kabushiki Kaisha, Nagoya-shi, Aichi-ken (JP)

(72) Inventor: Akira Minami, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/699,093

(22) Filed: Sep. 8, 2017

(65) Prior Publication Data

US 2018/0088874 A1 Mar. 29, 2018

(30) Foreign Application Priority Data

Sep. 29, 2016 (JP) .................................. 2016-190704

(51) Int. Cl.
*B41J 2/35* (2006.01)
*B41J 2/365* (2006.01)
*B41J 2/32* (2006.01)
*G06F 3/12* (2006.01)

(52) U.S. Cl.
CPC . *B41J 2/35* (2013.01); *B41J 2/32* (2013.01); *B41J 2/365* (2013.01); *G06F 3/1208* (2013.01); *G06F 3/1211* (2013.01); *G06F 3/1218* (2013.01)

(58) Field of Classification Search
CPC ............... B41J 2/35; B41J 2/355; B41J 2/365
See application file for complete search history.

(56) References Cited

U.S. PATENT DOCUMENTS

| 2007/0041766 | A1 | 2/2007 | Imai | |
|---|---|---|---|---|
| 2009/0309946 | A1* | 12/2009 | Saquib | B41J 2/3555 347/191 |
| 2011/0069131 | A1* | 3/2011 | Tamura | B41J 2/355 347/189 |

FOREIGN PATENT DOCUMENTS

JP 2007-050677 A 3/2007

* cited by examiner

*Primary Examiner* — Shelby L Fidler
(74) *Attorney, Agent, or Firm* — Banner & Witcoff, Ltd.

(57) ABSTRACT

A printer includes a controller configured to, based on print data, perform acquiring a condition value, calculating, for each type of dots, an additional period of time $a_n=(T_n+X_n)-(T_{n-1}X_{n-1})$, where $T_n$ represents a specified period of time for applying energy to a heating element to form an n-th type of dot, $X_n$ represents a correction period of time that is added to the specified period of time $T_n$ to correct a dot formation condition of the n-th type of dot in accordance with the condition value, a heating period of time $A_n$ for forming the n-th type of dot is obtained by adding the correction period of time $X_n$ to the specified period of time $T_n$, and is derived from adding the additional period of time $a_n$ to a heating period of time $A_{n-1}$, and setting the heating period of time $A_n=\Sigma_{k=1}^{n} a_k$, for each dot included in a target line.

18 Claims, 9 Drawing Sheets

PRINTER, AND METHOD AND COMPUTER-READABLE MEDIUM FOR THE SAME

CROSS-REFERENCE TO RELATED APPLICATION

This application claims priority under 35 U.S.C. § 119 from Japanese Patent Application No. 2016-190704 filed on Sep. 29, 2016. The entire subject matter of the application is incorporated herein by reference.

BACKGROUND

Technical Field

The following description relates to aspects of a printer, a method, and a computer-readable medium for performing printing on a print medium using a thermal head.

Related Art

Heretofore, a printer has been known that includes a thermal head having a plurality of heating elements arranged in a direction perpendicular to a conveyance direction for a print medium. The printer is configured to perform printing on the print medium by repeating energization of the heating elements and conveyance of the print medium on a line-by-line basis. In the print medium capable of developing a plurality of colors, a color development condition of each developable color thereof varies depending on a quantity of energy applied to the print medium by the thermal head. Hence, the printer controls a period of time during which the thermal head applies energy to the print medium, according to a color to be developed and a history of printing operations ever performed.

A user may wish to change a color development density of the print medium. In this case, for instance, the printer is allowed to change the color development density of the print medium by accepting a user's input to change settings for the color development density and adjusting the quantity of energy to be applied to the print medium based on the changed settings. Further, the color development density of the print medium may depend on an environmental temperature. In this case, for instance, the printer is allowed to maintain the color development density of the print medium constant even though the environmental temperature changes, by adjusting the quantity of energy to be applied to the print medium, according to a detected environmental temperature.

SUMMARY

Nonetheless, the known printer changes the color development density of the print medium by uniformly changing the quantity of energy to be applied to the print medium. Therefore, even in the print medium capable of developing the plurality of colors, it is not possible to change only the color development density of a single color. Further, a color developable at a lower temperature is more easily influenced by the environmental temperature than a color developable at a higher temperature. Thus, for instance, when the quantity of energy to be applied to the print medium is adjusted for a color developable at a lower temperature in accordance with the environmental temperature, the known printer might apply an excessive quantity of energy to the print medium in an attempt to cause the print medium to develop a color developable at a higher temperature.

Aspects of the present disclosure are advantageous to provide one or more improved techniques, for a printer, which make it possible to apply an appropriate quantity of energy to a print medium capable of forming a plurality of types of dots thereon, according to an environmental factor, for each type of dot.

According to aspects of the present disclosure, a printer is provided that includes a thermal head having a plurality of heating elements arranged in line along a particular direction, each heating element being configured to form, on a print medium, a plurality of types of dots in accordance with a quantity of energy applied to each heating element, the plurality of types of dots including first to N-th types of dots in an ascending order of a quantity of energy required for dot formation, a conveyor configured to convey the print medium in a conveyance direction perpendicular to the particular direction, and a controller configured to, based on print data, perform a particular process to print a plurality of lines each including a plurality of dots on the print medium, by controlling the quantity of energy to be applied to each heating element and controlling the conveyor to convey the print medium. The particular process includes acquiring a condition value that varies depending on an environment in which the printer is used, and calculating, for each of the first to N-th types of dots, an additional period of time $a_n$ given by $a_n = (T_n + X_n) - (T_{n-1} + X_{n-1})$, where n is an integer equal to or more than 1 and equal to or less than N, $T_n$ represents a specified period of time during which energy P is applied to a corresponding heating element to form an n-th type of dot, $X_n$ represents a correction period of time that is added to the specified period of time $T_n$ to correct a dot formation condition of the n-th type of dot in accordance with the condition value, $T_0$ is equal to 0, $X_0$ is equal to 0, a heating period of time $A_n$ required to form the n-th type of dot is obtained by adding the correction period of time $X_n$ to the specified period of time $T_n$, and the heating period of time $A_n$ required to form the n-th type of dot is derived from adding the additional period of time $a_n$ to a heating period of time $A_{n-1}$ required to form an (n−1)-th type of dot. The particular process further includes setting the heating period of time $A_n$ given by $A_n = \Sigma_{k=1}^{n} a_k$, for each dot included in a target line of the plurality of lines, in accordance with the print data, and applying the energy P to a corresponding heating element to form each individual dot included in the target line, during the set heating period of time $A_n$.

According to aspects of the present disclosure, the plurality of types of dots may be classified according to a color to be developed, achromatization, a gradation, and a size. Further, the dot formation condition may include a color development density and a size of a dot to be formed.

According to aspects of the present disclosure, further provided is a method implementable on a processor coupled with a printer. The printer includes a thermal head having a plurality of heating elements arranged in line along a particular direction, each heating element being configured to form, on a print medium, a plurality of types of dots in accordance with a quantity of energy applied to each heating element, the plurality of types of dots including first to N-th types of dots in an ascending order of a quantity of energy required for dot formation, and a conveyor configured to convey the print medium in a conveyance direction perpendicular to the particular direction. The printer is configured to, based on print data, print a plurality of lines each including a plurality of dots on the print medium, by controlling the quantity of energy to be applied to each heating element and controlling the conveyor to convey the print medium. The method includes acquiring a condition value that varies depending on an environment in which the printer is used, and calculating, for each of the first to N-th types of dots, an additional period of time $a_n$ given by $a_n = (T_n + X_n) - (T_{n-1} + X_{n-1})$, where n is an integer equal to or more than 1 and equal to or less than N, $T_n$ represents a specified period of time during which energy P is applied to a corresponding heating element to form an n-th type of dot, $X_n$ represents a correction period of time that is added to the specified period of time $T_n$ to correct a dot formation condition of the n-th type of dot in accordance with the condition value, $T_0$ is equal to 0, $X_0$ is equal to 0, a heating period of time $A_n$ required to form the n-th type of dot is obtained by adding the correction period of time $X_n$ to the specified period of time $T_n$, and the heating period of time $A_n$ required to form the n-th type of dot is derived from adding the additional period of time $a_n$ to a heating period of time $A_{n-1}$ required to form an (n−1)-th type of dot. The method further includes setting the heating period of time $A_n$ given by $A_n = \Sigma_{k=1}^{n} a_k$, for each dot included in a target line of the plurality of lines, in accordance with the print data, and applying the energy P to a corresponding heating element to form each individual dot included in the target line, during the set heating period of time $A_n$.

According to aspects of the present disclosure, further provided is a non-transitory computer-readable medium storing computer-readable instructions that are executable by a processor coupled with a printer. The printer includes a thermal head having a plurality of heating elements arranged in line along a particular direction, each heating element being configured to form, on a print medium, a plurality of types of dots in accordance with a quantity of energy applied to each heating element, the plurality of types of dots including first to N-th types of dots in an ascending order of a quantity of energy required for dot formation, and a conveyor configured to convey the print medium in a conveyance direction perpendicular to the particular direction. The instructions are configured to, when executed by the processor, cause the processor to, based on print data, perform a particular process to print a plurality of lines each including a plurality of dots on the print medium, by controlling the quantity of energy to be applied to each heating element and controlling the conveyor to convey the print medium. The particular process includes acquiring a condition value that varies depending on an environment in which the printer is used, and calculating, for each of the first to N-th types of dots, an additional period of time $a_n$ given by $a_n = (T_n + X_n) - (T_{n-1} + X_{n-1})$, where n is an integer equal to or more than 1 and equal to or less than N, $T_n$ represents a specified period of time during which energy P is applied to a corresponding heating element to form an n-th type of dot, $X_n$ represents a correction period of time that is added to the specified period of time $T_n$ to correct a dot formation condition of the n-th type of dot in accordance with the condition value, $T_0$ is equal to 0, $X_0$ is equal to 0, a heating period of time $A_n$ required to form the n-th type of dot is obtained by adding the correction period of time $X_n$ to the specified period of time $T_n$, and the heating period of time $A_n$ required to form the n-th type of dot is derived from adding the additional period of time $a_n$ to a heating period of time $A_{n-1}$ required to form an (n−1)-th type of dot. The particular process further includes setting the heating period of time $A_n$ given by $A_n = \Sigma_{k=1}^{n} a_k$, for each dot included in a target line of the plurality of lines, in accordance with the print data, and applying the energy P to a corresponding heating element to form each individual dot included in the target line, during the set heating period of time $A_n$.

BRIEF DESCRIPTION OF THE ACCOMPANYING DRAWINGS

Figure 4:
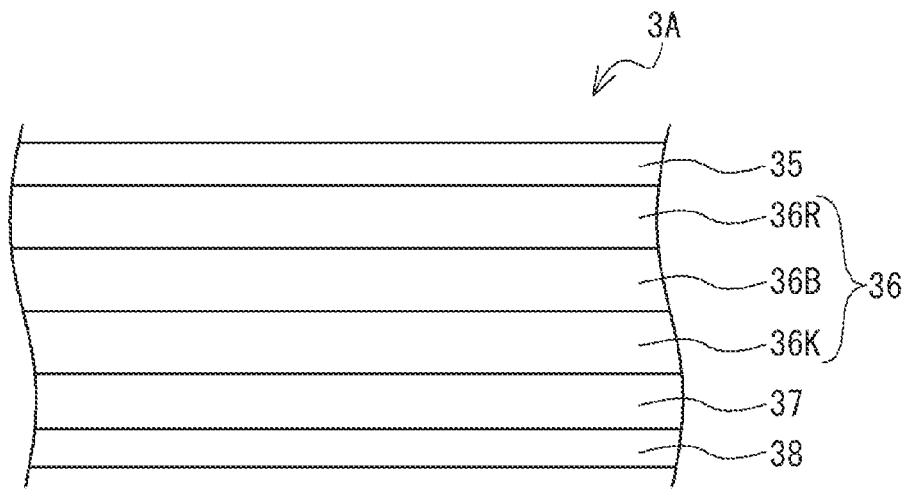

FIG. 4 schematically shows a configuration of a sheet for the printer in the illustrative embodiment according to one or more aspects of the present disclosure.

Figure 5:
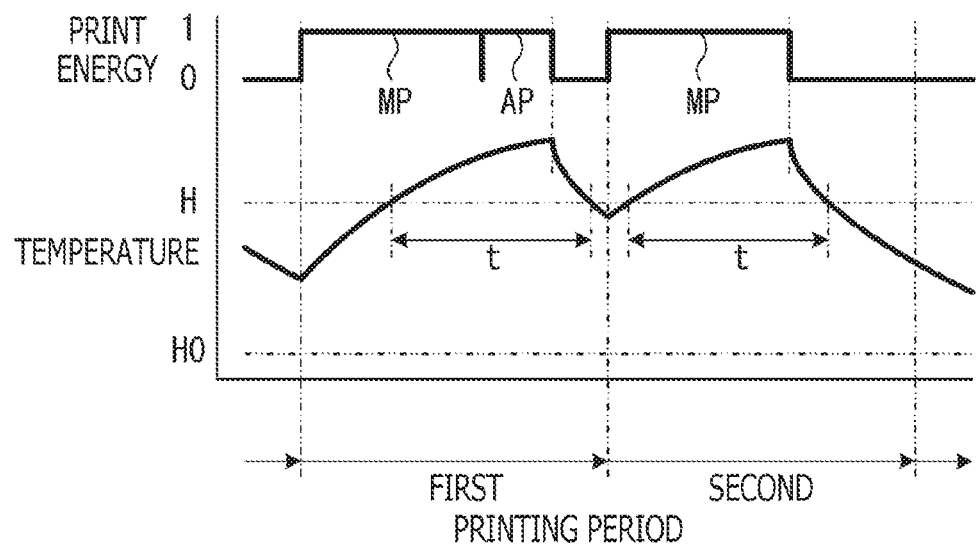

FIG. 5 is a graph showing a change in temperature of a heating element of a thermal head of the printer when post-heating energy is applied to the heating element, in the illustrative embodiment according to one or more aspects of the present disclosure.

Figure 6:
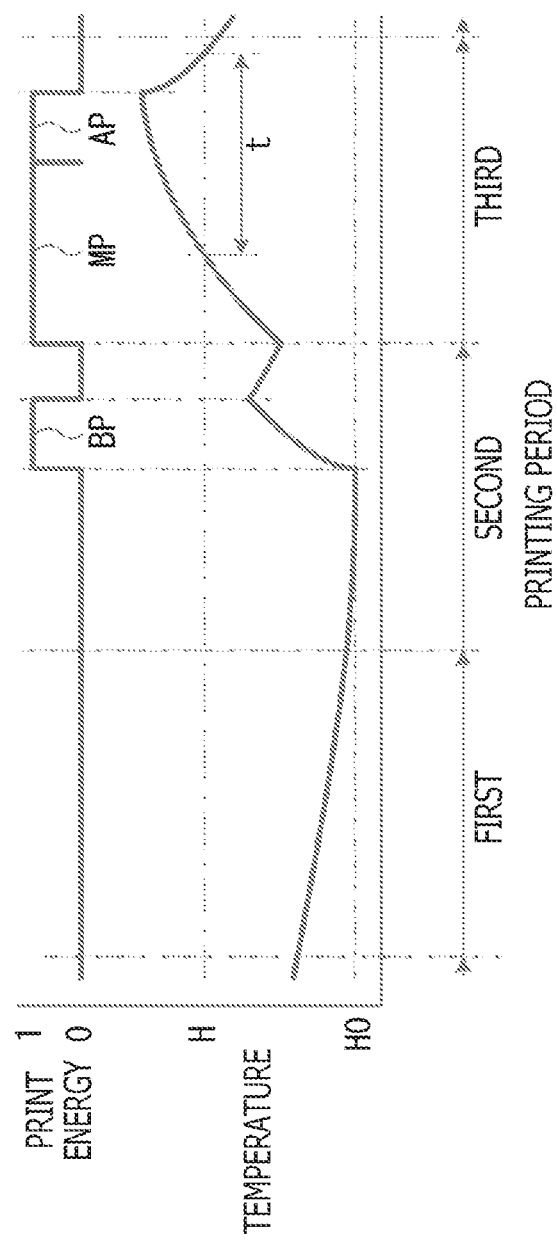

FIG. 6 is a graph showing a change in temperature of the heating element of the thermal head of the printer when preheating energy is applied to the heating element, in the illustrative embodiment according to one or more aspects of the present disclosure.

Figure 7:
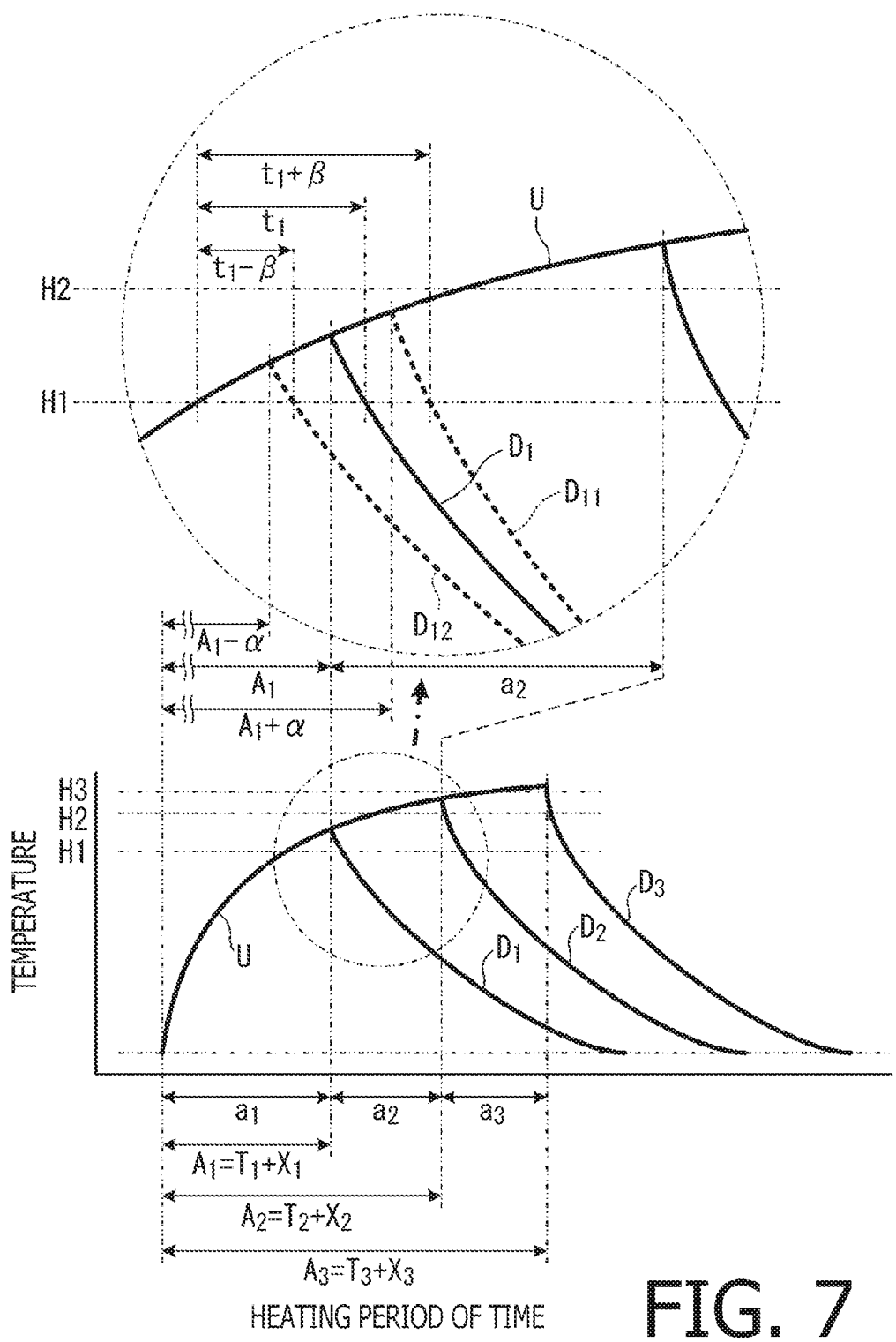

FIG. 7 is a graph showing a relationship between the temperature of the heating element and a heating period of time in the illustrative embodiment according to one or more aspects of the present disclosure.

Figure 8:
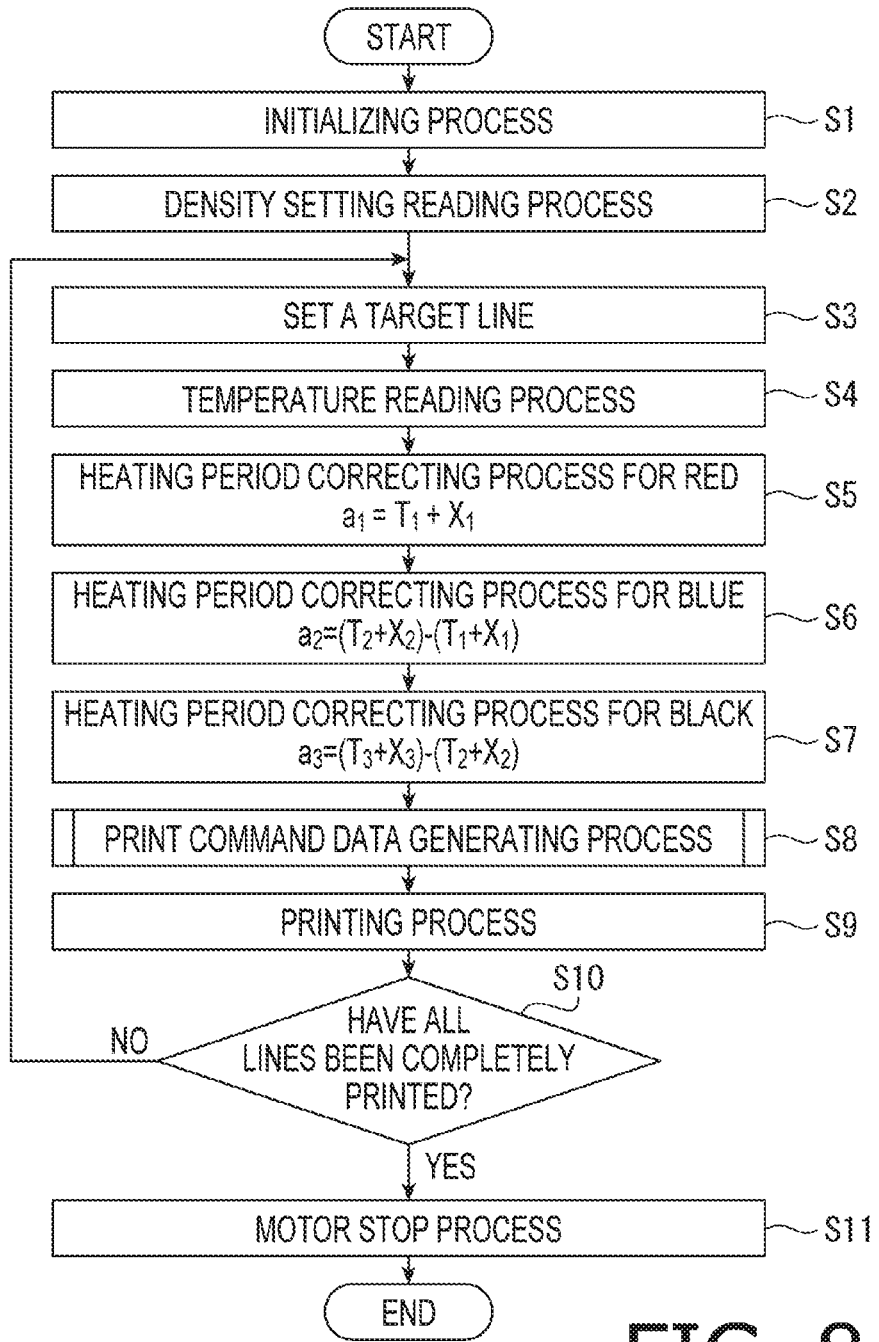

FIG. 8 is a flowchart showing a procedure of a main process to be performed by the printer executing a print program, in the illustrative embodiment according to one or more aspects of the present disclosure.

Figure 9:
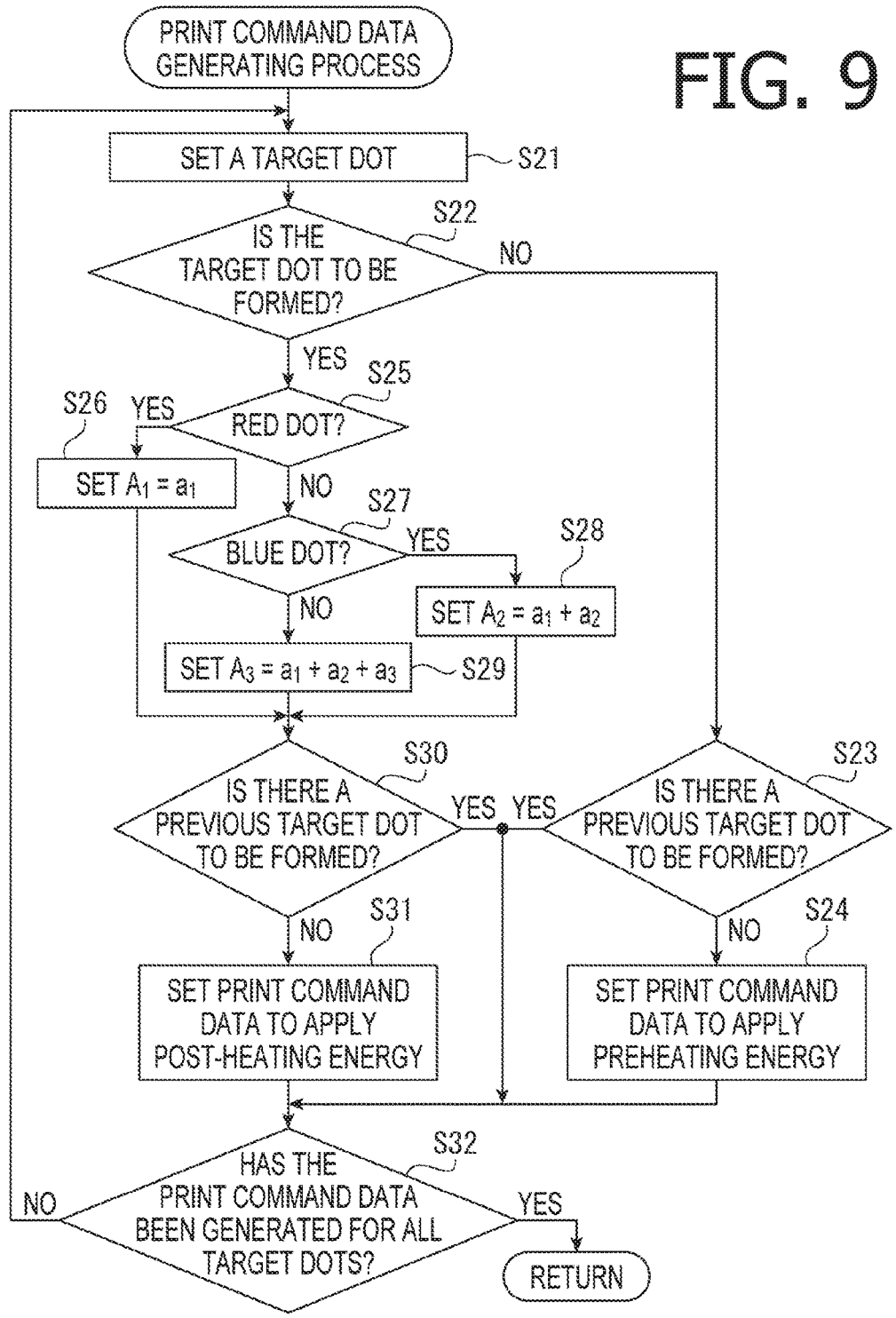

FIG. 9 is a flowchart showing a procedure of a print command data generating process in the illustrative embodiment according to one or more aspects of the present disclosure.

Figure 10:
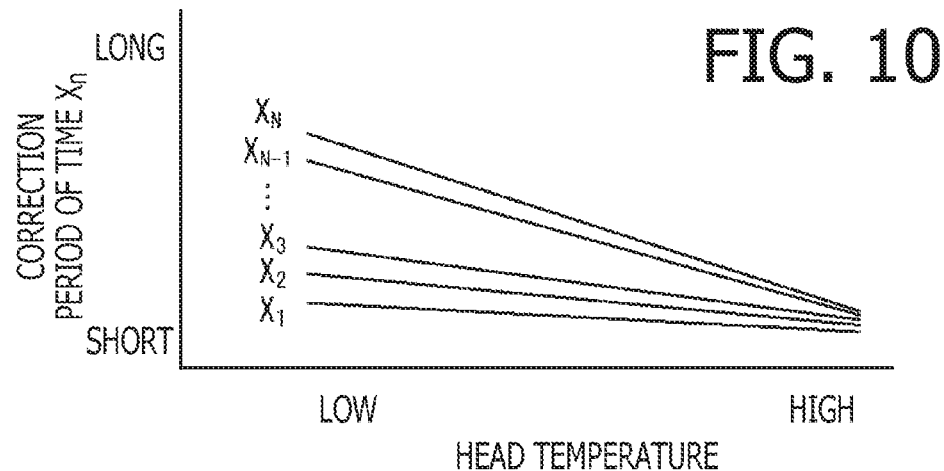

FIG. 10 is an exemplary graph showing a relationship between a correction period of time for each type of dot and a head temperature, in the illustrative embodiment according to one or more aspects of the present disclosure.

Figure 11:
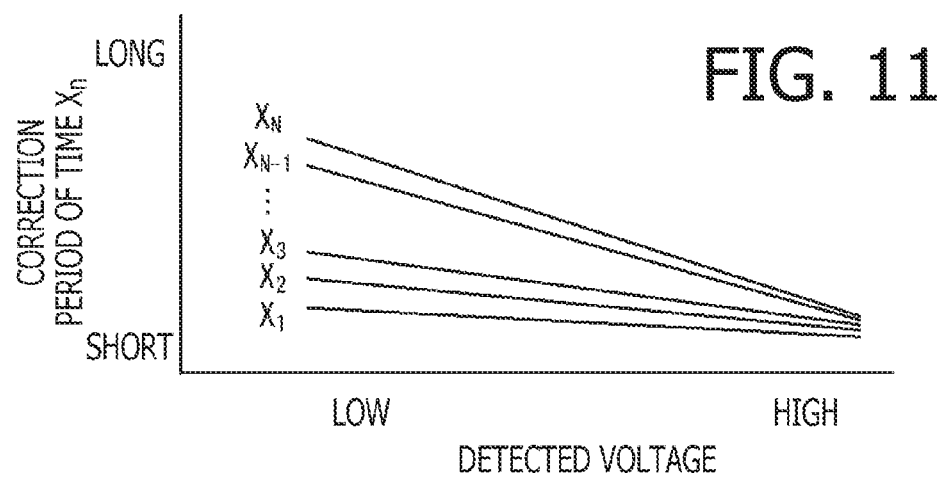

FIG. 11 is an exemplary graph showing a relationship between the correction period of time for each type of dot and a detected voltage, in the illustrative embodiment according to one or more aspects of the present disclosure.

Figure 12:
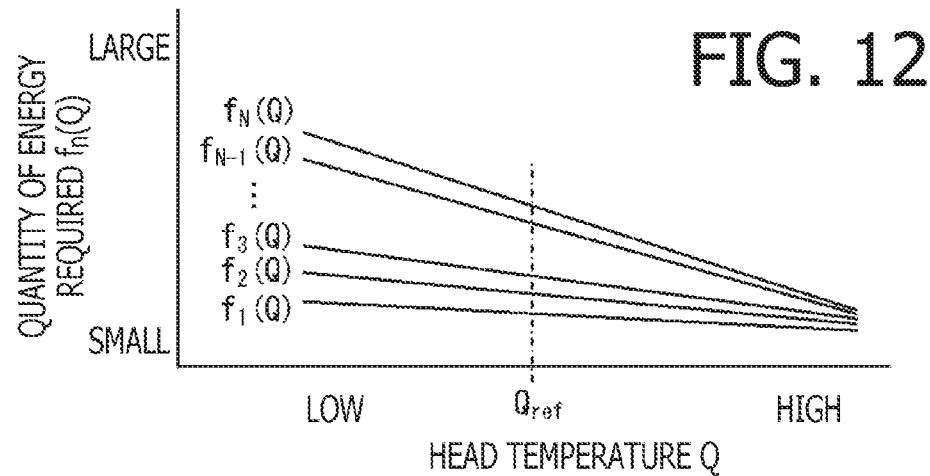

FIG. 12 is an exemplary graph showing a relationship between a quantity of energy required to form each type of dot and the head temperature, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. The drawings to be referred to in the following description are used to schematically show and set forth technical features according to aspects of the present disclosure. Nonetheless, the technical features shown in the drawings such as a configuration of an apparatus and flowcharts of various processes are just examples but are not limited to the ones exemplified in the drawings. In the following description, a lower right side, an upper left side, an upper right side, a lower left side, an upper side, and a lower side in FIG. 1 will be defined as a right side, a left side, a rear side, a front side, an upside and a downside of a printer 1, respectively. These directional definitions shall apply to descriptions referring to FIG. 2 and the subsequent drawings.

The following description presents an overview of the printer 1. The printer 1 is configured to connect with an external terminal (not shown) via a USB cable ("USB" is an abbreviated form of "Universal Serial Bus"). For instance, the external terminal may be a general personal computer (hereinafter simply referred to as a "PC"), a mobile terminal, or a tablet terminal. A CPU (not shown) of the external terminal executes a driver program (not shown) installed in the external terminal, thereby generating print data from image data. In order to express a plurality of pixels forming the image data with a plurality of dots on a print medium, the print data includes a plurality of pieces of dot data into which the image data is resolved to associate each piece of pixel data of the image data with a corresponding piece of dot data of the print data.

The printer 1 receives the print data from the external terminal and generates print command data based on the print data. The print command data is for driving a plurality of heating elements 32 of a thermal head 31. In the print command data, a single unit of command data is set with a command for controlling a heating element 32 to be energized based on an energization pattern and a command for restricting the heating element 32 from being energized during a cooling period of time after energization of the heating element 32. The CPU 51 performs printing on the print medium (e.g., a sheet 3A) by repeatedly performing, over a plurality of lines, a single-line dot forming process to form a plurality of dots for a single line by the heating elements 32 arranged in line. The print command data used for a single printing operation includes a plurality of units of command data corresponding to the number of dots to be formed in the single printing operation.

The printer 1 is configured to control a quantity of energy to be provided onto the print medium by each individual heating element 32 and perform three-color printing to form first-color dots, second-color dots, and third-color dots on the print medium. For instance, the print medium may be a long sheet 3A with a thermosensitive label attached onto a mount. In the illustrative embodiment, a printing sheet 3A with thermosensitive color developable layers 36 (see FIG. 4) laminated on a base material layer 37 is used as an example of the print medium. The printer 1 has, within a housing 2, a rolled sheet 3 as the long sheet 3A wound in a roll shape. The printer 1 performs printing while pulling the sheet 3A out of the rolled sheet 3.

Figure 1:
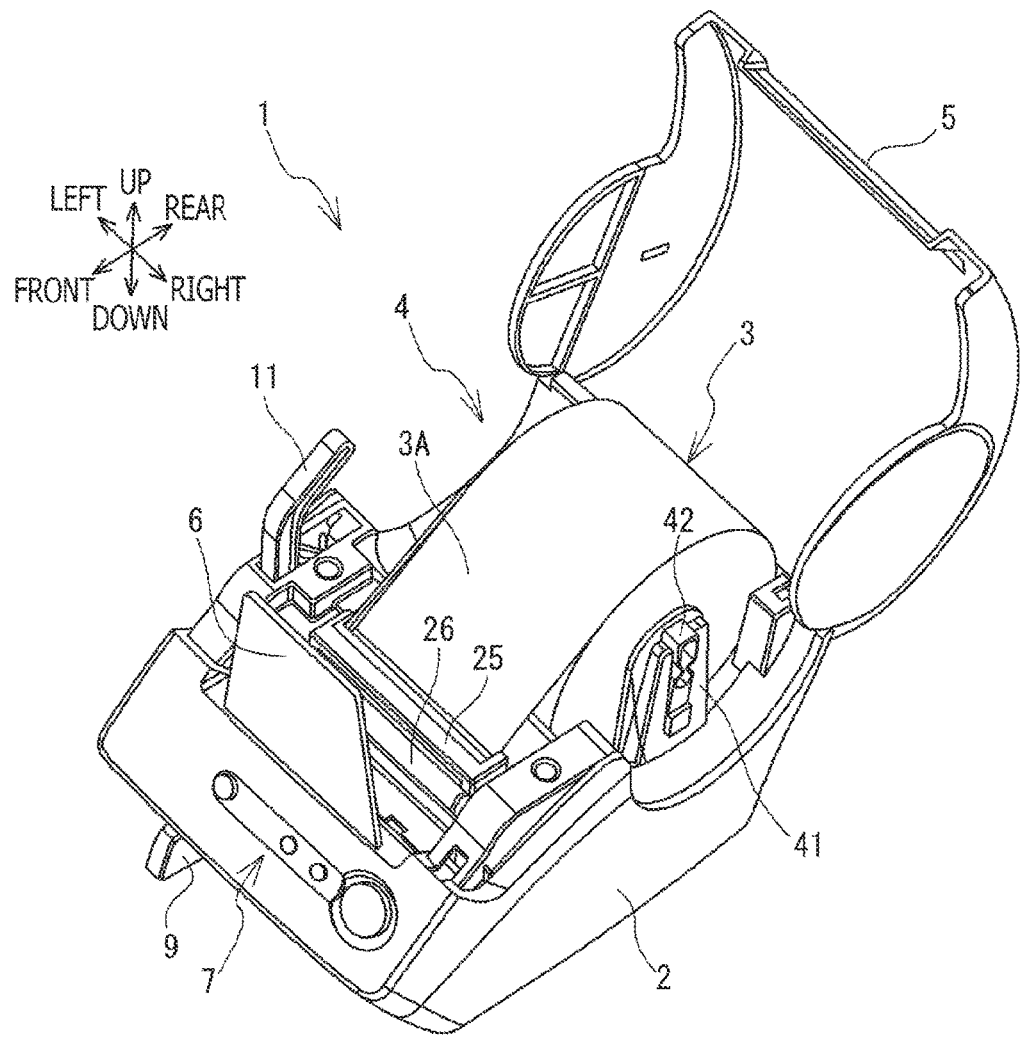
FIG. 1 is a perspective view showing a printer in a state where a cover is open, in an illustrative embodiment according to one or more aspects of the present disclosure.
Figure 2:
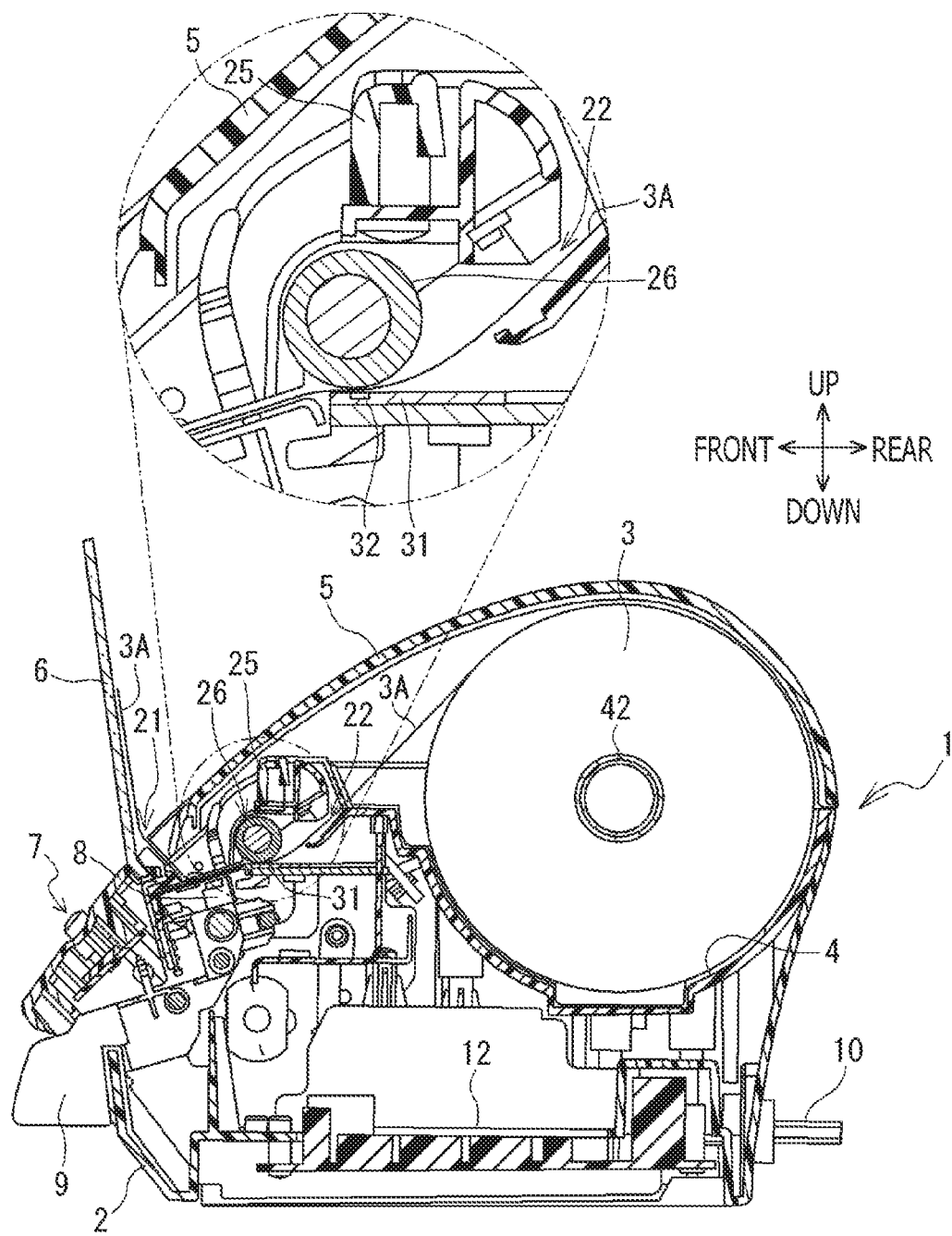
FIG. 2 is a cross-sectional side view showing the printer in a state where the cover is closed, in the illustrative embodiment according to one or more aspects of the present disclosure.

Referring to FIGS. 1 and 2, a configuration of the printer 1 will be described. As shown in FIG. 1, the printer 1 includes the housing 2 formed in a box shape with an open upper side. The housing 2 is formed in a rectangular shape in each of a front view and a plane view. The housing 2 is elongated in a front-to-rear direction. The open upper side of the housing 2 is covered with a cover 5. A rear part of each of left and right side portions of the housing 2 is open and covered with the cover 5. The cover 5 is rotatably supported by a rear end portion of the housing 2. The cover 5 is configured to swing around a rotation axis extending in a left-to-right direction in such a manner that a front end portion of the cover 5 moves up and down. When the cover 5 is closed, a rear part of an upper portion of the housing 2 is formed substantially in a round shape in a side view, and a front part of the upper portion of the housing 2 is inclined down in a forward direction.

The housing 2 has a cut lever 9 at a front surface thereof. The cut lever 9 is movable in the left-to-right direction. The cut lever 9 is connected with a cutter unit 8 (see FIG. 2). In response to movement of the cut lever 9 in the left-to-right direction, the cutter unit 8 moves in the left-to-right direction to cut the printed sheet 3A. At an upper surface of a front end portion of the housing 2, input keys 7 are disposed. The input keys 7 include a power switch. Behind the input keys 7 (i.e., at a rear side of the input keys 7), a plate-shaped tray 6 made of transparent resin is erected. Behind the tray 6, a discharge port 21 (see FIG. 2) is disposed. The discharge port 21 is elongated in the left-to-right direction. The discharge port 21 is formed by the front end portion of the cover 5 and the housing 2. The tray 6 is configured to receive the printed sheet 3A discharged via the discharge port 21. At a lower portion of a rear surface of the housing 2, a connector (not shown) is disposed that is connectable with a power cord 10 (see FIG. 2). Further, at the lower portion of the rear surface of the housing 2, a connector (not shown) is disposed that is connectable with a USB cable (not shown) for connecting the printer 1 with the external terminal.

As shown in FIG. 2, a sheet storage 4 is disposed at a rear portion inside the housing 2. The sheet storage 4 is formed to be recessed downward in an arc shape in a side view (when viewed in the left-to-right direction). An upper side, a left side, and a right side of the sheet storage 4 are open. The rolled sheet 3 (i.e., the sheet 3A wound in a roll shape) is set into the sheet storage 4. The rolled sheet 3 is wound with a printable surface as an inner side, and is held by a tape spool 42. The tape spool 42 engages with supporters 41 (see FIG. 1) erected at a left portion and a right portion of the sheet storage 4. Thus, the rolled sheet 3 is supported by the tape spool 42 to be rotatable in the sheet storage 4. When the cover 5 is open, the tape spool 42 is detachably attached to the supporters 41. A control board 12 is disposed below the sheet storage 4. The control board 12 has a CPU 51 (see FIG. 3) mounted thereon. The CPU 51 is configured to take overall control of the printer 1.

A lever 11 (see FIG. 1) is disposed at a front left side relative to the sheet storage 4. At a right side relative to the lever 11, a roller holder 25 is disposed. The roller holder 25 extends in the left-to-right direction. The roller holder 25 is configured to rotatably hold a platen roller 26. The lever 11 is always urged upward by a coil spring (not shown). When the cover 5 is closed, the lever 11 is pressed down by the cover 5. The lever 11 is connected with the roller holder 25. In conjunction with the lever 11 swinging up and down, the roller holder 25 moves up and down around a rear end thereof as a supporting point. In response to the lever 11 swinging down, the roller holder 25 moves downward. The platen roller 26 presses the sheet 3A pulled out of the rolled sheet 3, toward the thermal head 31. In this case, the printer 1 is brought into a printable state. In response to the cover 5 being opened, the lever 11 swings up, and thereby the roller holder 25 is moved upward. The platen roller 26 held by the roller holder 25 is separated from the thermal head 31 and the sheet 3A. In this case, the printer 1 is brought into an unprintable state.

The housing 2 includes a conveyance path 22. The conveyance path 22 is for conveying the sheet 3A pulled out of the rolled sheet 3, obliquely toward a lower front side from a front end of the sheet storage 4. The conveyance path 22 passes between the platen roller 26 and the thermal head 31, and extends up to the discharge port 21. In the illustrative embodiment, the printer 1 is configured to perform printing on the sheet 3A while conveying the sheet 3A from the sheet storage 4 to the discharge port 21. In the following description, a direction in which the sheet 3A is conveyed along and within the conveyance path 22 may be referred to as a "conveyance direction."

The platen roller 26 and the thermal head 31 are disposed substantially at a middle portion of the conveyance path 22. The thermal head 31 is configured to form a dot by heating the sheet 3A to develop a color of dye contained in the sheet 3A. The thermal head 31 is formed in a plate shape. The thermal head 31 includes a plurality of heating elements 32 in an upper surface thereof. The heating elements 32 are arranged in line along a main scanning direction (i.e., the left-to-right direction) perpendicular to the conveyance direction of the sheet 3A. For instance, in the illustrative embodiment, the thermal head 31 includes 360 heating elements 32 arranged in line along the main scanning direction. It is noted that in a position where the thermal head 31 is disposed, a direction perpendicular to the main scanning direction along which the heating elements 32 are arranged may be referred to as a "sub scanning direction." Near the heating elements 32, the sub scanning direction is coincident with the conveyance direction. The thermal head 31 is provided with a thermistor 33 (see FIG. 3). The thermistor 33 is configured to detect a temperature of the thermal head 31.

The platen roller 26 is rotatably supported by the roller holder 25. The platen roller 26 is disposed above the thermal head 31. The platen roller 26 is disposed in such a manner that an axial direction thereof is coincident with the main scanning direction parallel to the arrangement of the heating elements 32. Further, the platen roller 26 is opposed to the heating elements 32. The platen roller 26 is urged toward the thermal head 31 by the roller holder 25. The platen roller 26 is connected with a conveyance motor 60 (see FIG. 3) via one or more gears (not shown). The platen roller 26 is driven to rotate by the conveyance motor 60. The platen roller 26 and the thermal head 31 pinch the sheet 3A therebetween. When driven to rotate, the platen roller 26 conveys the sheet 3A.

The CPU 51 (see FIG. 3) of the printer 1 is configured to form on the sheet 3A a dot line of dots arranged in line according to the arrangement of the heating elements 32, by controlling a quantity of energy to be applied to each heating element 32. The dot line may be simply referred to as a "line." Further, the CPU 51 controls a specific quantity of energy to be applied to each heating element 32 in synchronization with drive control of the platen roller 26. Thereby, a plurality of lines are formed on the sheet 3A to be arranged parallel to each other in a direction perpendicular to the arrangement direction of dots in a single line. The plurality of lines express shades of each color by existence (or non-existence) of individual dots formed on the sheet 3A, thereby forming a character and/or an image on the sheet 3A. In the following description, the arrangement direction of dots in a single line formed on the sheet 3A may be referred to as a "main scanning direction" for the sake of explanatory convenience. Further, the direction in which a plurality of lines are arranged parallel to each other on the sheet 3A may be referred to as a "sub scanning direction" for the sake of explanatory convenience.

Figure 3:
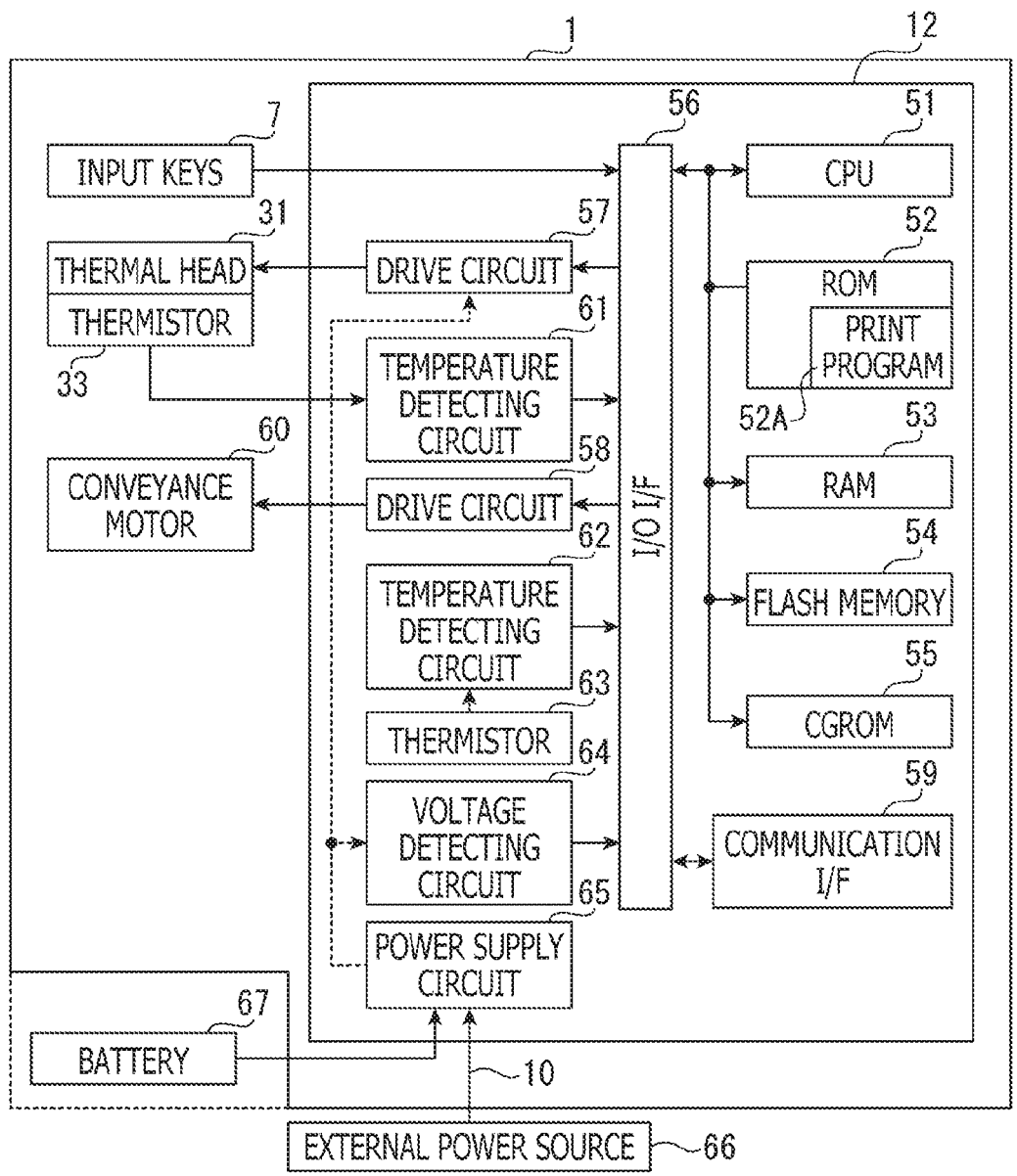
FIG. 3 is a block diagram showing an electrical configuration of the printer in the illustrative embodiment according to one or more aspects of the present disclosure.

Referring to FIG. 3, an electrical configuration of the printer 1 will be described. The printer 1 includes the CPU 51 configured to control the printer 1. The CPU 51 is connected with a ROM 52, a RAM 53, a flash memory 54, and a CGROM 55. The ROM 52 is configured to store programs executable by the CPU 51. A below-mentioned print program 52A is stored in the ROM 52. The RAM 53 is configured to store various kinds of temporary data. The flash memory 54 is configured to store various kinds of data such as factory default setting values to be used when the print program 52A is executed. The CGROM 55 is configured to store dot pattern data for printing various characters on the sheet 3A.

The CPU 51 is connected, via an input-output interface (hereinafter referred to as an "I/O I/F") 56, with the input keys 7, drive circuits 57 and 58, temperature detecting circuits 61 and 62, a communication interface (hereinafter referred to as a "communication I/F") 59, and a voltage detecting circuit 64. The input keys 7 (see FIG. 1) disposed at the upper surface of the printer 1 are configured to accept user operations. The drive circuit 57 is configured to apply a corresponding quantity of energy to each heating element 32 of the thermal head 31. The CPU 51 controls heat generation of each individual heating element 32 via the drive circuit 57. The drive circuit 58 is configured to drive the conveyance motor 60. The conveyance motor 60 may be a pulse motor. The CPU 51 controls the conveyance motor 60 via the drive circuit 58, thereby rotating the platen roller 26. Thus, the sheet 3A is conveyed on a line-by-line basis at a particular speed.

The temperature detecting circuit 61 is configured to detect a temperature (hereinafter referred to as a "head temperature") of the thermal head 31 with the thermistor 33 provided to the thermal head 31. The temperature detecting circuit 62 is configured to detect a temperature (hereinafter referred to as a "board temperature") of the control board 12 on which electronic circuits including the CPU 51 are mounted, with a thermistor 63 provided to the control board 12.

The communication I/F 59 is configured to perform communication with the external terminal via the USB cable (not shown). The printer 1 receives print data from the external terminal (e.g., a PC) via the USB cable. The communication I/F 59 may be configured to communicate with the external terminal via a wireless connection such as Bluetooth (trademark registered) and Wi-Fi (trademark registered).

The voltage detecting circuit 64 is configured to detect a voltage supplied from a power supply circuit 65 to the drive circuit 57. The power supply circuit 65 is connected with a power cord 10. The power supply circuit 65 converts an AC power supplied from an external power source 66 (e.g., an AC power source) into a constant-voltage DC power, and stably supplies the constant-voltage DC power to the control board 12. The printer 1 includes a battery 67 (e.g., a dry battery and a rechargeable battery). The battery 67 is detachably attached to the printer 1. The battery 67 is connected with the power supply circuit 65. When not supplied with an electric power from the external power source 66, the power supply circuit 65 is supplied with a DC power from the battery 67, and supplies the DC power to the control board 12. When using a rechargeable battery as the battery 67, the printer 1 may have the battery 67 as a built-in battery.

Referring to FIG. 4, the sheet 3A in the illustrative embodiment will be described. As described above, the sheet 3A is a print medium configured to develop one of the three colors on a dot-by-dot basis depending on the quantity of energy applied to the print medium by each individual heating element 32 of the thermal head 31. The sheet 3A is pulled out of the rolled sheet 3 as the long sheet 3A wound in a roll shape, and is fed onto the conveyance path. The sheet 3A is pinched between the thermal head 31 and the platen roller 26. In the following description, a surface of the sheet 3A that faces the thermal head 31 in a printing operation may be referred to as a first surface or a first side. A surface of the sheet 3A opposite to the first surface may be referred to as a second surface or a second side. In FIG. 4, the first surface of the sheet 3A faces upward.

The sheet 3A includes a protective layer 35, the thermosensitive color developable layers 36, the base material layer 37, and a release paper 38 in descending order from the first surface. The protective layer 35 is a transparent layer configured to protect a first-side surface (i.e., an upper surface in FIG. 4) of the thermosensitive color developable layers 36. Each of the thermosensitive color developable layers 36 is configured to develop a corresponding color when heated to a particular temperature for a particular period of time by each heating element 32 of the thermal head 31. The thermosensitive color developable layers 36 include three layers configured to develop mutually-different colors when heated. For instance, in the illustrative embodiment, the thermosensitive color developable layers 36 have a red color developable layer 36R, a blue color developable layer 36B, and a black color developable layer 36K in descending order from the first surface. The red color developable layer 36R contains a developer and a leuco dye that generates a red pigment when reacting with the developer. The blue color developable layer 36B contains a developer and a leuco dye that generates a blue pigment when reacting with the developer. The black color developable layer 36K contains a developer and a leuco dye that generates a black pigment when reacting with the developer. Each of the red color developable layer 36R, the blue color developable layer 36B, and the black color developable layer 36K is transparent before developing the corresponding color.

The CPU 51 of the printer 1 is enabled to form an intended type of dot on the sheet 3A by controlling conditions for applying energy to the thermosensitive color developable layers 36. Types of dots are classified according to a color to be developed, achromatization, a gradation (density), and a size. In the illustrative embodiment, the CPU 51 is enabled to cause the thermosensitive color developable layers 36 to develop an intended one of the three colors as a type of dot. The blue color developable layer 36B is configured to develop a blue color when heated at a higher temperature than a temperature for the red color developable layer 36R. The black color developable layer 36K is configured to develop a black color when heated at a higher temperature than the temperature for the blue color developable layer 36B. It is noted that, in the illustrative embodiment, "color development" is not limited to developing a specific color by applying energy to a specific spot of the print medium but may include achromatizing a specific spot of the print medium by applying energy to the specific spot. For instance, the red color developable layer 36R may contain an achromatizing agent as well as the developer and the leuco dye. In this case, (a heated spot of) the red color developable layer 36R is allowed to change into a type of dot with a red color developed by a reaction between the developer and the leuco dye and a type of dot achromatized by a reaction between the developer and the achromatizing agent, depending on conditions for applying energy to the red color developable layer 36R. Namely, in the illustrative embodiment, not only "developing a specific color" but also "achromatization" may be construed as forming a definition of "color development." Further, in the illustrative embodiment, printing by the printer 1 is not limited to printing on thermosensitive media but may include heat transfer printing.

The base material layer 37 is a foundation supporting the other layers of the sheet 3A. For instance, a color of the base material layer 37 is white. As described above, the thermosensitive color developable layers 36 are transparent before developing the respective colors. Hence, when none of the thermosensitive color developable layers 36 develops the corresponding color, the color of the sheet 3A is white as the color of the base material layer 37. A second-side surface (i.e., a lower surface in FIG. 4) of the base material layer 37 is coated with adhesive. The release paper 38 is detachably attached onto the second-side surface of the base material layer 37. The release paper 38 protects the adhesive. When the release paper 38 is detached from the sheet 3A after completion of the printing operation, the user is allowed to attach the sheet 3A onto a desired location via the adhesive. The sheet 3A may be a thermal paper with no adhesive provided on the second-side surface of the base material layer 37. Further, the sheet 3A may be a cut sheet that is not in a roll shape.

As described above, in the illustrative embodiment, the CPU 51 of the printer 1 is configured to form three types of dots (i.e., red dots, blue dots, and black dots) on the sheet 3A by controlling the conditions for applying energy to the thermosensitive color developable layers 36 in accordance with the print data received, e.g., from a PC. In the print data, values "1" to "3" represent dots to be formed on the sheet 3A, and a value "0" represents an area with no dot formed. More specifically, the value "1" corresponds to red, the value "2" corresponds to blue, and the value "3" corresponds to black. The color of a spot (dot) of the sheet 3A that has not developed any one of the three colors is white as the color of the base material layer 37. When executing the below-mentioned print program 52A, the CPU 51 generates print command data that associates a command based on an energization pattern for energizing each heating element 32 of the thermal head 31 with a corresponding piece of dot data of the print data.

The CPU 51 of the printer 1 periodically performs an operation of energizing the heating elements 32. During a single printing period, the CPU 51 performs a single operation of applying print energy to the heating elements 32, thereby printing a single line. The CPU 51 determines a quantity of print energy to be applied to the heating elements 32, by performing condition control and correction control. A line to be printed during a single printing period will be referred to a "target line." A dot to which print energy is applied in an operation of printing the target line will be referred to as a "target dot." The last line to be printed before the target line is printed will be referred to as a "previous target line." In the previous target line, a dot adjacent to the target dot in the conveyance direction for conveying the sheet 3A will be referred to as a "previous target dot." The condition control is for adjusting a quantity of print energy to be applied to form the target dot in accordance with dot forming conditions of the previous target dot. The correction control is for correcting a quantity of print energy to be applied to the heating elements 32 in accordance with environmental factors. The environmental factors may include but are not limited to a voltage to be applied as the print energy by the external power source 66 or the battery 67, a temperature (hereinafter, which may be referred to as a "head temperature") of the thermal head 31, a temperature (hereinafter, which may be referred to as a "board temperature") of the control board 12, and dot forming conditions (e.g., a color development density) specified by the user.

The condition control will be described. As shown in FIG. 5, in order to form a single dot, the CPU 51 applies main energy MP and post-heating energy AP as print energy to a heating element 32 for forming the single dot, during a single printing period. The main energy MP represents a quantity of energy to be applied to the heating element 32 to heat the heating element 32. The CPU 51 applies the main energy MP to the heating element 32 by supplying energy P (in the illustrative embodiment, an electric power supplied from the AC power source) for a heating period of time $A_n$ depending on an intended type of dot to be formed. When a heating temperature of the heating element 32 becomes higher than a color development temperature H, the heating element 32 is allowed to form a dot on the sheet 3A. The color development temperature H is a temperature that enables a dye contained in the sheet 3A to develop a corresponding color (red, blue, or black). As will be described later, color development temperatures H for red, blue, and black are identified by reference characters "H1," "H2," and "H3," respectively. Nonetheless, for the sake of explanatory convenience, the "color development temperature H" may be referred to without using any of the reference characters "H1," "H2," and "H3" when a particular color needs to be specified as a color to be developed.

The post-heating energy AP represents a quantity of energy to be applied to the heating element 32 in addition to the main energy MP during the same printing period as the single printing period in which the main energy MP is applied. The CPU 51 applies the post-heating energy AP to the heating element 32 by supplying energy P for a particular period of time. When the post-heating energy AP needs to be applied, the CPU 51 applies the post-heating energy AP continuously from a moment at which the CPU 51 completes applying the main energy MP. When the post-heating energy AP is applied, the heating element 32 is allowed to maintain a state where the heating temperature of the heating element 32 is higher than the color development temperature H, during a specific period of time t. The sheet 3A develops a specific color at a temperature higher than the color development temperature H. Further, the color development density of the specific color varies depending on the length of the specific period of time t during which the heating temperature of the heating element 32 is kept higher than the color development temperature H.

When the main energy MP and the post-heating energy AP are applied to the heating element 32 in a first printing period, a temperature of the heating element 32 at the beginning of a second printing period continuous with the first printing period is higher than a temperature of the heating element 32 at the beginning of the first printing period. Therefore, if the main energy MP and the post-heating energy AP are applied to form a dot in the second printing period, the heating element 32 will be excessively heated, and it might lead to a dot formed in a crashed shape due to excessive color development. Hence, when forming two dots (i.e., a previous target dot and a target dot) adjoining in the conveyance direction, the CPU 51 applies only the main energy MP without applying the post-heating energy AP, to form the dot (i.e., the target dot) in the second printing period. Thus, it is possible to avoid excessive heat storage in the heating element 32 and prevent the target dot from being formed in a crashed shape in the second printing period.

As shown in FIG. 6, suppose for instance that none of two dots adjoining in the conveyance direction is formed in any of the first printing period and the second printing period continuous with the first printing period. In this case, if none of the main energy MP and the post-heating energy AP is applied in any of the first and second printing periods, a temperature of the heating element 32 at the beginning of a third printing period continuous with the second printing period will be lower than a temperature of the heating element 32 at the beginning of the second printing period. Hence, in this case, even though the main energy MP and the post-heating energy AP are applied to the heating element 32 in the third printing period, the heating element 32 is not allowed to maintain the state where the heating temperature of the heating element 32 is higher than the color development temperature H, during the specific period of time t. Thus, it might result in a dot formed in a blurred manner. Therefore, when none of the two dots (the previous target dot and the target dot) adjoining in the conveyance direction is formed, a preheating energy BP is applied to the heating element 32 in the second printing period in order to raise the temperature of the heating element 32 at the beginning of the third printing period. The preheating energy BP represents a quantity of energy to be applied to the heating element 32 in a printing period during which the main energy MP is not applied. The CPU 51 applies the preheating energy BP to the heating element 32 by supplying energy P for a particular period of time. After the preheating energy BP has been applied in the second printing period, when the main energy MP and the post-heating energy AP are applied in the third printing period, the heating element 32 is allowed to certainly maintain the state where the heating temperature of the heating element 32 is higher than the color development temperature H, during the specific period of time t.

Subsequently, the correction control will be described. As shown in FIG. 7, a heating period of time $A_n$ is defined as a period of time during which energy P is supplied as the main energy MP to the heating element 32 to form an n-th type of dot in ascending order of a quantity of energy required for dot formation. In the illustrative embodiment, a first type of dot is a red dot. A second type of dot is a blue dot. A third type of dot is a black dot. In response to the main energy MP being applied to the heating element 32, the temperature of the heating element 32 increases along a temperature rising curve U with the lapse of a heating period of time. For instance, a heating period of time required for causing a dot to develop the red color is a heating period of time $A_1$. A heating period of time required for causing a dot to develop the blue color is a heating period of time $A_2$. A heating period of time required for causing a dot to develop the black color is a heating period of time $A_3$.

When supplied with the energy P during the period of time $A_1$ as a standard heating time, the heating element 32 is kept during a period of time $t_1$ in a state where the temperature of the heating element 32 is controlled to be equal to or more than the color development temperature H1 and less than the color development temperature H2. Thereby, a red dot is formed. The temperature of the heating element 32 increases along the temperature rising curve U. After a lapse of the period of time $A_1$, the temperature of the heating element 32 decreases along a temperature dropping curve D1. When the energy P is applied during a period of time $(A_1+\alpha)$ that is longer than the standard heating time, the temperature of the heating element 32 increases along the temperature rising curve U. After a lapse of the period of time $(A_1+\alpha)$, the temperature of the heating element 32 decreases along a temperature dropping curve D11. In this case, the temperature of the heating element 32 is kept more than the color development temperature H1 during a period of time $(t1+\beta)$ that is longer than the period of time $t_1$. Thereby, a density of the red dot is higher than when the heating element 32 is supplied with the energy P during the standard heating time. When the energy P is applied during a period of time $(A_1-\alpha)$ that is shorter than the standard heating time, the temperature of the heating element 32 increases along the temperature rising curve U. After a lapse of the period of time $(A_1-\alpha)$, the temperature of the heating element 32 decreases along a temperature dropping curve D12. In this case, the temperature of the heating element 32 is kept more than the color development temperature H1 during a period of time $(t_1-\beta)$ that is shorter than the period of time $t_1$. Thereby, the density of the red dot is lower than when the heating element 32 is supplied with the energy P during the standard heating time. Accordingly, by changing the heating period of time $A_1$ appropriately as needed, the printer 1 is allowed to adjust the density of the red dot. The same applies to the blue dot and the black dot.

The density of a color of a dot may vary depending on the aforementioned environmental factors. In the illustrative embodiment, by the correction control, the printer 1 corrects the heating period of time $A_n$ in accordance with a setting of the density of each color and the head temperature (i.e., the temperature of the thermal head 31) at a time when the printer 1 begins to perform a printing operation for the target line.

The heating period of time $A_n$ is given by the following expression (1).

$$A_n = T_n + X_n \quad (1)$$

"n" represents an integer that is equal to or more than 1 and less than N. "$T_n$" is a specified period of time (a constant number) during which the energy P is applied to the heating element 32. "$X_n$" is a correction period of time to be added to the specified period of time $T_n$ in order to correct a dot forming condition of the n-th type of dot in accordance with the environmental factors. The correction period of time $X_n$ varies depending on the head temperature and the setting of the density of the color to be developed. For instance, when the head temperature is a standard temperature that does not need any correction, and the setting of the density of the color to be developed is a setting of a standard density that does not need any correction, the correction period of time $X_n$ is equal to 0, and the heating period of time $A_n$ is equal to the specified period of time $T_n$. The correction period of time $X_n$ is given by a function having, as arguments, the head temperature or a corresponding value and a setting value of the density of the color to be developed.

The heating period of time $A_2$ for forming a blue dot is determined by adding an additional period of time $a_2$ to the heating period of time $A_1$ for forming a red dot. The heating period of time $A_3$ for forming a black dot is determined by adding an additional period of time $a_3$ to the heating period of time $A_2$ or forming a blue dot. Namely, the heating period of time $A_n$ for forming the n-th type of dot is determined by adding the additional period of time $a_n$ to the heating period of time $A_{n-1}$ for forming the (n−1)-th type of dot. The additional period of time $a_n$ is given by the following expression (2).

$$a_n = A_n - A_{n-1} = (T_n + X_n) - (T_{n-1} + X_{n-1}) \quad (2)$$

It is noted that To is equal to 0, and $X_0$ is equal to 0.

Namely, the heating period of time $A_n$ is a sum of the additional periods of time $a_n$ and given by the following expression (3).

$$A_n = \sum_{k=1}^{n} a_k \quad (3)$$

In the below-mentioned print program 52A, the CPU 51 of the printer 1 is allowed to individually adjust the density of each type of dot by calculating the heating period of time $A_n$ for forming the n-th type of dot based on the expressions (2) and (3). Thereby, for instance, when the heating period of time $A_1$ for forming a red dot increases by a period of time $\alpha$ due to the environmental factors, the additional period of time $a_2$ for a blue dot is equal to a period of time $(a_2-\alpha)$. Therefore, the correction of the heating period of time $A_1$ for forming a red dot in accordance with the environmental factors has no influence on the heating period of time $A_2$ for forming a blue dot. The same applies to correction of the heating period of time $A_1$ in formation of other types of dots.

Referring to FIGS. 8 and 9, an explanation will be provided of a printing process to be performed by the printer 1 executing the print program 52A. In response to receiving print data from the external terminal via the USB cable, the CPU 51 of the printer 1 executes the print program 52A. As shown in FIG. 8, the CPU 51 performs a main process. In the main process, the CPU 51 first performs an initializing process (S1). In the initializing process, the CPU 51 secures, in the RAM 53, various kinds of storage areas to store parameters and counters. The CPU 51 secures an area for storing the print data in the RAM 53.

The CPU 51 acquires, from a buffer, the print data received from the external terminal, and stores the print data into the area secured in the RAM 53. The CPU 51 reads a density setting value for each type of dot from various initial setting values for the print program 52A that are stored in the flash memory 54 (S2: a density setting reading process). For instance, the user is allowed to set one of values 1 to 5 as the density setting value for each of the three colors (i.e., red, blue, and black). When the density setting value for a color is 3, the density of the color is set to a standard density. The density setting value may be set in response to the CPU 51 accepting a user's input operation via the input keys 7 when executing an initial value changing program (not shown).

Based on the print data, the CPU 51 sets the first line as a target line (S3). The CPU 51 acquires a head temperature (i.e., a temperature of the thermal head 31) (S4: a temperature reading process). The head temperature is detected by the thermistor 33 and input into the CPU 51 via the temperature detecting circuit 61. The CPU 51 calculates a correction period of time $X_1$. The correction period of time $X_1$ is given by a predetermined function with the density setting value for red and the head temperature as arguments. Based on the expression (2), the CPU 51 calculates an additional period of time $a_1$ by adding the correction period of time $X_1$ to a specified period of time $T_1$ (S5: a heating period correcting process for red). The additional period of time $a_1$ is stored into the RAM 53.

The CPU 51 calculates a correction period of time $X_2$. The correction period of time $X_2$ is given by a predetermined function with the density setting value for blue and the head temperature as arguments. Based on the expression (2), the CPU 51 calculates an additional period of time $a_2$ by subtracting the value (i.e., the sum of the specified period of time $T_1$ and the correction period of time $X_1$) calculated in S5 from a value obtained by adding the correction period of time $X_2$ to a specified period of time $T_2$ (S6: a heating period correcting process for blue). The additional period of time $a_2$ is stored into the RAM 53.

The CPU 51 calculates a correction period of time $X_3$. The correction period of time $X_3$ is given by a predetermined function with the density setting value for black and the head temperature as arguments. Based on the expression (2), the CPU 51 calculates an additional period of time $a_3$ by subtracting the value (i.e., the sum of the specified period of time $T_2$ and the correction period of time $X_2$) calculated in S6 from a value obtained by adding the correction period of time $X_3$ to a specified period of time $T_3$ (S7: a heating period correcting process for black). The additional period of time $a_3$ is stored into the RAM 53.

The CPU 51 performs a print command data generating process (S8). As shown in FIG. 9, in the print command data generating process, the CPU 51 first sets the first dot of the target line as a target dot (S21). The CPU 51 reads print data of the target dot, and determines whether to form the target dot (S22). When the print data of the target data is 0, the CPU 51 determines that the target dot is not to be formed (S22: No). Then, the CPU 51 goes to S23.

The CPU 51 determines whether there is a previous target dot to be formed (S23). Since the first line does not have a previous target line, the CPU 51 determines that there is not a previous target dot to be formed (S23: No). The CPU 51 sets print command data to apply the preheating energy BP to a heating element 32 corresponding to the target dot (S24). Then, the CPU 51 goes to S32. In a printing operation for the second or subsequent lines, when the previous target dot of the previous target line is formed, there is no need to apply the preheating energy BP to the corresponding heating element 32. Thus, when determining that there is a previous target dot to be formed (S23: Yes), the CPU 51 goes to S32 without executing S24.

The CPU 51 determines whether the print command data has been generated for all target dots of the target line (S32). When determining that there is a target dot for which the print command data has not been generated (S32: No), the CPU 51 goes back to S21 and sets, as a target dot, a next dot in a dot arrangement order of the target line (S21). When the print data of the target dot is 1, 2, or 3, since the target dot is formed to develop the red color, the blue color, or the black color (S22: Yes), the CPU 51 goes to S25.

The CPU 51 determines whether the target dot is set to develop the red color (S25). When the print data of the target dot is 1, the target dot is set to develop the red color (S25: Yes). Based on the expression (3), the CPU 51 calculates the heating period of time $A_1$ from the additional period of time $a_1$ determined in S5 (S26). The CPU 51 stores the heating period of time $A_1$ into the RAM 53, and goes to S30.

When the print data of the target dot is 2, the target dot is set to develop the blue color (S25: No, and S27: Yes). Based on the expression (3), the CPU 51 calculates the heating period of time $A_2$ from the additional periods of time $a_1$ and $a_2$ respectively determined in S5 and S6 (S28). The CPU 51 stores the heating period of time $A_2$ into the RAM 53, and goes to S30.

When the print data of the target dot is 3, the target dot is set to develop the black color (S25: No, and S27: No). Based on the expression (3), the CPU 51 calculates the heating period of time $A_3$ from the additional periods of time $a_1$, $a_2$, and $a_2$ respectively determined in S5, S6, and S7 (S29). The CPU 51 stores the heating period of time $A_3$ into the RAM 53, and goes to S30.

The CPU 51 determines whether there is a previous target dot to be formed (S30). Since the first line does not have a previous target line, the CPU 51 determines that there is not a previous target dot to be formed (S30: No), and then goes to S31. The CPU 51 sets print command data to apply the post-heating energy AP to a heating element corresponding to the target dot (S31), and then goes to S32. In a printing operation for the second or subsequent lines, when the previous target dot of the previous target line is formed, there is no need to apply the post-heating energy AP to the corresponding heating element 32. Thus, when determining that there is a previous target dot to be formed (S30: Yes), the CPU 51 goes to S32 without executing S31.

As described above, when completing generating the print command data for all target dots of the target line by repeatedly performing the steps S21 to S32 (S32: Yes), the CPU 51 returns to the main process (see FIG. 8) and goes to S9. As shown in FIG. 8, the CPU 51 performs a printing process to print a single line on the sheet 3A in accordance with the print command data for the single line that has been generated in the print command data generating process (S9). The CPU 51 controls the conveyance motor 60 via the drive circuit 58, to convey the sheet 3A over a distance corresponding to a single line.

Based on the print command data, the CPU 51 applies the main energy MP to a heating element 32 corresponding to a dot for which the heating period of time $A_n$ is set, by supplying the energy P for the heating period of time $A_n$ to the corresponding heating element 32, thereby forming a red, blue, or black dot. Based on the print command data, the CPU 51 applies the post-heating energy AP to a heating element 32 corresponding to a dot for which the post-heating energy AP is set, by supplying the energy P for a particular period of time, thereby ensuring the quality of the dot formed as a red, blue, or black dot. Based on the print command data, the CPU 51 applies the preheating energy BP to a heating element 32 corresponding to a dot for which the preheating energy BP is set, by supplying the energy P for a particular period of time, thereby preheating the corresponding heating element 32. Thus, a single line is formed that may include red dots, blue dots, black dots, and/or white blanks with no dots formed.

The CPU 51 determines whether all lines included in the print data have been completely printed (S10). When determining that there is a line that has not yet been printed (S10: No), the CPU 51 goes back to S3, in which the CPU 51 sets, as a target line, a next line in a line arrangement order (S3). In the same manner as described above, the CPU 51 repeatedly executes the steps S3 to S10 to print the newly-set target line. When determining that all lines included in the print data have been completely printed (S10: Yes), the CPU 51 performs a motor stop process to stop the conveyance motor 60 (S11). In the motor stop process, the CPU 51 controls the conveyance motor 60 to convey the sheet 3A over a previously-set distance to a predetermined cutting position. When the sheet 3A is conveyed over the previously-set distance and placed in the cutting position, the CPU 51 stops the conveyance motor 60. The CPU 51 terminates the main process that is being performed by the CPU 51 executing the print program 52A. The sheet 3A with all the lines printed thereon is cut when the user moves the cut lever 9.

As described above, the printer 1 is configured to individually correct each of the respective heating periods of time $A_n$ required for forming N types of dots, in accordance with the head temperature or a corresponding value, and the setting value of the density of the color to be developed. Hence, even though the head temperature or the setting value of the density of the color to be developed changes, the printer 1 is allowed to maintain a dot formation condition of each type of dot constant.

The head temperature at the time of forming the target dot varies depending on whether the previous target dot is formed and which type of dot the previous target dot is. By making the determinations in S25 and S27 and adding an additional period of time to the corresponding heating period of time $A_n$ in accordance with the dot formation condition of the previous target dot, the printer 1 is allowed to maintain the dot formation condition of each type of dot constant.

The printer 1 is configured to individually correct a quantity of energy required to form each dot in accordance with the head temperature. Hence, the printer 1 is allowed to maintain the dot formation condition of each type of dot constant even though the head temperature changes.

When performing printing on the sheet 3A with the three colors, i.e., red, blue, and black, the printer 1 is allowed to maintain the density of each color constant even though the head temperature changes.

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the following modifications are possible.

Modifications

In the aforementioned illustrative embodiment, the CPU 51 reads the head temperature in S4, and determines the additional period of time $a_n$ by calculating the correction period of time $X_n$ that is given by a predetermined function with the head temperature as an argument. Nonetheless, the CPU 51 may read the board temperature in S4, and determines the additional period of time $a_n$ by calculating the correction period of time $X_n$ that is given by a predetermined function with the board temperature as an argument. Further, the CPU 51 may acquire in S4 a voltage from the external power source 66 or the battery 67 that has been detected by the voltage detecting circuit 64, and determines the additional period of time $a_n$ by calculating the correction period of time $X_n$ that is given by a predetermined function with the detected voltage as an argument. In this case, the printer 1 may be configured to individually correct a quantity of energy required to form each type of dot in accordance with a voltage applied to a corresponding heating element 32. Hence, the printer 1 is allowed to maintain the dot formation condition of each type of dot constant even though the voltage applied to the corresponding heating element 32 changes.

Further, heat conductivities of the thermosensitive color developable layers 36 vary depending on the configuration of the print medium such as the number of layers for each color, types of the developers, and use/non-use of a microcapsule in the thermosensitive color developable layers 36. Therefore, the correction period of time $X_n$ may be given by a predetermined function with a type of the print medium used for printing as an argument. Further, the heating period of time $A_n$ required for color development varies depending on shapes of the temperature rising curve U and the temperature dropping curves D. Therefore, the correction period of time $X_n$ may be given by a predetermined function with a type of the thermal head 31 as an argument.

In the aforementioned illustrative embodiment, in the print command data generating process, the CPU 51 sets the heating period of time $A_n$ during which the energy P is applied to a heating element 32 corresponding to each target dot. Nonetheless, the CPU 51 may set a quantity of energy to be applied to a heating element 32 corresponding to each target dot in the print command data generating process, and may set a heating period of time according to the set quantity of energy in the printing process.

In the aforementioned illustrative embodiment, the printer 1 identifies, as the previous target dot, a dot supplied with energy in printing of the previous target line by a specific heating element 32 for forming the target dot. Nonetheless, the printer 1 may identify, as previous target dots, a plurality of dots supplied with energy in printing of the previous target line by the specific heating element 32 for forming the target dot and both heating elements 32 adjacent to the specific heating element 32. Further, for instance, the printer 1 may identify, as previous target dots, the dot that is supplied with energy in an operation of printing the previous target line by the specific heating element 32 for forming the target dot and a dot that is supplied with energy by the specific heating element 32 in an operation of printing the last line to be printed before the previous target line is printed.

In the aforementioned illustrative embodiment, the CPU 51 additionally applies the preheating energy BP or the post-heating energy AP to the specific heating element 32 for forming the target dot, in accordance with whether the previous target dot has been formed and whether the target dot is to be formed. Nonetheless, the CPU 51 may not additionally apply the preheating energy BP or the post-heating energy AP to the specific heating element 32 for forming the target dot, regardless of whether the previous target dot has been formed and whether the target dot is to be formed. Further, the CPU 51 may additionally apply only the preheating energy BP without applying the post-heating energy AP to the specific heating element 32, or may additionally apply only the post-heating energy AP without applying the preheating energy BP to the specific heating element 32. Further, the CPU 51 may additionally apply the post-heating energy AP to the specific heating element 32 depending on which type of dot the previous target dot is. In this case, for instance, the CPU 51 may additionally apply the post-heating energy AP to the specific heating element 32 when the previous target dot is a red dot, and may not additionally apply the post-heating energy AP to the specific heating element 32 when the previous target dot is a blue dot or a black dot.

In the aforementioned illustrative embodiment, in order to calculate the heating period of time $A_n$, the CPU 51 calculates the correction period of time $X_n$ that is given by a predetermined function with the density setting value for each color and the head temperature as arguments, and determines the additional period of time $a_n$ based on the correction period of time $X_n$. Nonetheless, the method for calculating the heating period of time $A_n$ is not limited to the above method. Hereinafter, for the sake of explanatory convenience, as shown in FIG. 10, it is assumed that the correction period of time $X_n$ is given by a predetermined function with the head temperature as an argument. Among the correction periods of time $X_n$ for the first to N-th types of dots, a correction period of time for a reference type of dot is represented by $X_{ref}$. Further, a correction coefficient, which is multiplied by a sum of the additional periods of time $a_1$ to $a_{ref}$ in order to correct a heating period of time $A_{ref}$ for the reference type of dot in accordance with the head temperature, is represented by $T_A$. In this case, the heating period of time $A_{ref}$ is given by the following expression (4).

$$A_{ref} = T_A \sum_{k=1}^{ref} a_k \qquad (4)$$

When a correction period of time for another type of dot is determined by a difference from the correction period of time $X_{ref}$, the heating period of time $A_n$ is determined by the following expression (5).

$$A_n = T_A \sum_{k=1}^{n} a_k \qquad (5)$$

Accordingly, when setting the heating period of time $A_n$ in S26, S28, and S29, the CPU 51 may calculate the heating period of time $A_n$ based on the above expression (5). Thereby, it is possible to correct the heating period of time $A_n$ for each type of dot on the basis of a dot formation condition of the reference type of dot at a detected temperature. Therefore, the printer 1 is allowed to maintain the dot formation condition of each type of dot constant even though a temperature inside the printer 1 changes.

Further, as shown in FIG. 11, it is assumed that the correction period of time Xn is given by a predetermined function with a detected voltage as an argument. Among the correction periods of time $X_n$ for the first to N-th types of dots, a correction period of time for a reference type of dot is represented by $X_{ref}$. Further, a correction coefficient, which is multiplied by a sum of the additional periods of time $a_1$ to $a_{ref}$ in order to correct a heating period of time $A_{ref}$ for the reference type of dot in accordance with the detected voltage, is represented by $P_{ref}$. In this case, the heating period of time $A_{ref}$ is given by the following expression (6).

$$A_{ref} = P_{ref} \sum_{k=1}^{ref} a_k \qquad (6)$$

When a correction period of time for another type of dot is determined by a difference from the correction period of time $X_{ref}$, the heating period of time $A_n$ is determined by the following expression (7).

$$A_n = P_{ref} \sum_{k=1}^{n} a_k \qquad (7)$$

Accordingly, when setting the heating period of time $A_n$ in S26, S28, and S29, the CPU 51 may calculate the heating period of time $A_n$ based on the above expression (7). Thereby, it is possible to correct the heating period of time $A_n$ for each type of dot on the basis of a dot formation condition of the reference type of dot with respect to the detected voltage. Therefore, the printer 1 is allowed to maintain the dot formation condition of each type of dot constant even though a voltage applied to a corresponding heating element 32 changes.

Further, as shown in FIG. 12, it is assumed that the main energy MP is given by a predetermined function $f_n(Q)$ with a head temperature Q as an argument. A reference head temperature is represented by a reference temperature $Q_{ref}$. A difference between the head temperature Q and the reference temperature $Q_{ref}$ is represented by a difference temperature $\Delta Q$. In this case, a quantity of energy required to form the n-th type of dot is given by the following expression (8).

$$f_n(Q_{ref}+\Delta Q)=P \cdot A_n=P(T_n+X_n)=P \cdot T_n+\Delta Q \cdot f'_n(Q_{ref}) \qquad (8)$$

Namely, the following expression (9) is derived.

$$P \cdot X_n = \Delta Q \cdot f'_n(Q_{ref}) \qquad (9)$$

Based on the expression (9), the additional period of time $a_n$ given by the expression (2) is determined by the following expression (10).

$$a_n = \left\{ T_n + \frac{\Delta Q \cdot f'_n(Q_{ref})}{P} \right\} - \left\{ T_{n-1} + \frac{\Delta Q \cdot f'_{n-1}(Q_{ref})}{P} \right\} \qquad (10)$$

Accordingly, when calculating the additional period of time $a_n$ in S5 to S7, the CPU 51 may calculate the additional period of time $a_n$ based on the above expression (10). Thereby, it is possible to set the correction period of time $X_n$ to correct the additional period of time $a_n$ for each type of dot in accordance with the difference temperature $\Delta Q$ between the reference temperature $Q_{ref}$ and the head temperature Q. Therefore, the printer 1 is allowed to maintain the dot formation condition of each type of dot even though the head temperature changes.

What is claimed is:
1. A printer comprising:
 a thermal head having a plurality of heating elements arranged in line along a particular direction, each heating element being configured to form, on a print medium, a plurality of types of dots in accordance with a quantity of energy applied to each heating element, the plurality of types of dots including first to N-th types of dots in an ascending order of a quantity of energy required for dot formation;
 a conveyor configured to convey the print medium in a conveyance direction perpendicular to the particular direction; and
 a controller configured to, based on print data, perform a particular process to print a plurality of lines each including a plurality of dots on the print medium, by controlling the quantity of energy to be applied to each heating element and controlling the conveyor to convey the print medium, the particular process comprising:

acquiring a condition value that varies depending on an environment in which the printer is used;

calculating, for each of the first to N-th types of dots, an additional period of time $a_n$ given by:

$$a_n = (T_n + X_n) - (T_{n-1} + X_{n-1}),$$

where n is an integer equal to or more than 1 and equal to or less than N, $T_n$ represents a specified period of time during which energy P is applied to a corresponding heating element to form an n-th type of dot, $X_n$ represents a correction period of time that is added to the specified period of time $T_n$ to correct a dot formation condition of the n-th type of dot in accordance with the condition value, $T_0$ is equal to 0, $X_0$ is equal to 0, a heating period of time $A_n$ required to form the n-th type of dot is obtained by adding the correction period of time $X_n$ to the specified period of time $T_n$, and the heating period of time $A_n$ required to form the n-th type of dot is derived from adding the additional period of time $a_n$ to a heating period of time $A_{n-1}$ required to form an (n−1)-th type of dot;

setting the heating period of time $A_n$ given by:

$$A_n = \sum_{k=1}^{n} a_k,$$

wherein the heating period of time $A_n$ required to form the n-th type of dot is set for each dot included in a target line of the plurality of lines, in accordance with the print data; and applying the energy P to a corresponding heating element to form each individual dot included in the target line, during the set heating period of time $A_n$.

2. The printer according to claim 1, wherein the particular process further comprises:

determining a dot formation condition of a previous target dot included in a previous target line, the previous target line being a last line to be printed before the target line is printed, the previous target dot being adjacent to a target dot included in the target line, the target dot being a dot for which the heating period of time $A_n$ is set; and adding a supplemental period of time to the heating period of time $A_n$ in accordance with the determined dot formation condition of the previous target dot.

3. The printer according to claim 1, further comprising a temperature detector configured to detect a temperature Q inside the printer, wherein the condition value includes the temperature Q detected by the temperature detector.

4. The printer according to claim 3, wherein when a quantity of energy required to form the n-th type of dot is represented by a function $f_n(Q)$ with the detected temperature Q as an argument, the quantity of energy required to form the n-th type of dot is given by:

$$f_n(Q_{ref} + \Delta Q) = P \cdot T_n + \Delta Q \cdot f'_n(Q_{ref}),$$

where $Q_{ref}$ represents a reference temperature inside the printer, and $\Delta Q$ represents a difference between the detected temperature Q and the reference temperature $Q_{ref}$, wherein the particular process further comprises:

calculating, for each of the first to N-th types of dots, the additional period of time $a_n$ given by:

$$a_n = \left\{ T_n + \frac{\Delta Q \cdot f'_n(Q_{ref})}{P} \right\} - \left\{ T_{n-1} + \frac{\Delta Q \cdot f'_{n-1}(Q_{ref})}{P} \right\}.$$

5. The printer according to claim 3, wherein when the correction period of time $X_n$ for the n-th type of dot according to the detected temperature Q is determined by a difference from a correction period of time $X_{ref}$ for a reference type of dot among the first to N-th types of dots according to the detected temperature Q, the heating period of time $A_n$ is given by a following particular expression:

$$A_n = T_A \sum_{k=1}^{n} a_k,$$

where $T_A$ represents a correction coefficient that is multiplied by a sum of the additional periods of time $a_1$ to $a_{ref}$ required to form the reference type of dot, in order to correct a dot formation condition of the reference type of dot in accordance with the detected temperature Q, and wherein the particular process further comprises:

setting the heating period of time $A_n$ given by the particular expression, for each dot included in the target line, in accordance with the print data.

6. The printer according to claim 1, further comprising a voltage detector configured to detect a voltage supplied to each heating element of the thermal head, wherein the condition value includes the voltage detected by the voltage detector.

7. The printer according to claim 6, wherein when the correction period of time $X_n$ for the n-th type of dot according to the detected voltage is determined by a difference from a correction period of time $X_{ref}$ for a reference type of dot among the first to N-th types of dots according to the detected voltage, the heating period of time $A_n$ is given by a following specific expression:

$$A_n = P_{ref} \sum_{k=1}^{n} a_k,$$

where $P_{ref}$ represents a correction coefficient that is multiplied by a sum of the additional periods of time $a_1$ to $a_{ref}$ required to form the reference type of dot, in order to correct a dot formation condition of the reference type of dot in accordance with the detected voltage, and wherein the particular process further comprises:

setting the heating period of time $A_n$ given by the specific expression, for each dot included in the target line, in accordance with the print data.

8. The printer according to claim 1, wherein the plurality of types of dots formable on the print medium are two types of dots.

9. The printer according to claim 1,
wherein the controller comprises:
a processor; and
a memory storing processor-executable instructions configured to, when executed by the processor, cause the processor to perform the particular process.

10. A method implementable on a processor coupled with a printer, the printer comprising:
a thermal head having a plurality of heating elements arranged in line along a particular direction, each heating element being configured to form, on a print medium, a plurality of types of dots in accordance with a quantity of energy applied to each heating element, the plurality of types of dots including first to N-th types of dots in an ascending order of a quantity of energy required for dot formation; and
a conveyor configured to convey the print medium in a conveyance direction perpendicular to the particular direction,
wherein the printer is configured to, based on print data, print a plurality of lines each including a plurality of dots on the print medium, by controlling the quantity of energy to be applied to each heating element and controlling the conveyor to convey the print medium, the method comprising:
acquiring a condition value that varies depending on an environment in which the printer is used;
calculating, for each of the first to N-th types of dots, an additional period of time $a_n$ given by:

$$a_n = (T_n + X_n) - (T_{n-1} + X_{n-1}),$$

where n is an integer equal to or more than 1 and equal to or less than N,
$T_n$ represents a specified period of time during which energy P is applied to a corresponding heating element to form an n-th type of dot,
$X_n$ represents a correction period of time that is added to the specified period of time $T_n$ to correct a dot formation condition of the n-th type of dot in accordance with the condition value,
$T_0$ is equal to 0,
$X_0$ is equal to 0,
a heating period of time $A_n$ required to form the n-th type of dot is obtained by adding the correction period of time $X_n$ to the specified period of time $T_n$, and
the heating period of time $A_n$ required to form the n-th type of dot is derived from adding the additional period of time $a_n$ to a heating period of time $A_{n-1}$ required to form an (n−1)-th type of dot;
setting the heating period of time $A_n$ given by:

$$A_n = \sum_{k=1}^{n} a_k,$$

wherein the heating period of time $A_n$ required to form the n-th type of dot is set for each dot included in a target line of the plurality of lines, in accordance with the print data; and
applying the energy P to a corresponding heating element to form each individual dot included in the target line, during the set heating period of time $A_n$.

11. A non-transitory computer-readable medium storing computer-readable instructions that are executable by a processor coupled with a printer, the printer comprising:
a thermal head having a plurality of heating elements arranged in line along a particular direction, each heating element being configured to form, on a print medium, a plurality of types of dots in accordance with a quantity of energy applied to each heating element, the plurality of types of dots including first to N-th types of dots in an ascending order of a quantity of energy required for dot formation; and
a conveyor configured to convey the print medium in a conveyance direction perpendicular to the particular direction,
wherein the instructions are configured to, when executed by the processor, cause the processor to, based on print data, perform a particular process to print a plurality of lines each including a plurality of dots on the print medium, by controlling the quantity of energy to be applied to each heating element and controlling the conveyor to convey the print medium, the particular process comprising:
acquiring a condition value that varies depending on an environment in which the printer is used;
calculating, for each of the first to N-th types of dots, an additional period of time $a_n$ given by:

$$a_n = (T_n + X_n) - (T_{n-1} + X_{n-1}),$$

where n is an integer equal to or more than 1 and equal to or less than N,
$T_n$ represents a specified period of time during which energy P is applied to a corresponding heating element to form an n-th type of dot,
$X_n$ represents a correction period of time that is added to the specified period of time $T_n$ to correct a dot formation condition of the n-th type of dot in accordance with the condition value,
$T_0$ is equal to 0,
$X_0$ is equal to 0,
a heating period of time $A_n$ required to form the n-th type of dot is obtained by adding the correction period of time $X_n$ to the specified period of time $T_n$, and
the heating period of time $A_n$ required to form the n-th type of dot is derived from adding the additional period of time $a_n$ to a heating period of time $A_{n-1}$ required to form an (n−1)-th type of dot;
setting the heating period of time $A_n$ given by:

$$A_n = \sum_{k=1}^{n} a_k,$$

wherein the heating period of time $A_n$ required to form the n-th type of dot is set for each dot included in a target line of the plurality of lines, in accordance with the print data; and
applying the energy P to a corresponding heating element to form each individual dot included in the target line, during the set heating period of time $A_n$.

12. The non-transitory computer-readable medium according to claim 11,
wherein the particular process further comprises:
determining a dot formation condition of a previous target dot included in a previous target line, the previous target line being a last line to be printed before the target line is printed, the previous target dot being adjacent to a target dot included in the target line, the target dot being a dot for which the heating period of time $A_n$ is set; and adding a supplemental period of time to the heating period of time $A_n$ in accordance with the determined dot formation condition of the previous target dot.

13. The non-transitory computer-readable medium according to claim 11, wherein the printer further comprises a temperature detector configured to detect a temperature Q inside the printer, wherein the condition value includes the temperature Q detected by the temperature detector.

14. The non-transitory computer-readable medium according to claim 13, wherein when a quantity of energy required to form the n-th type of dot is represented by a function $f_n(Q)$ with the detected temperature Q as an argument, the quantity of energy required to form the n-th type of dot is given by:

$$f_n(Q_{ref}+\Delta Q)=P \cdot T_n+\Delta Q \cdot f'_n(Q_{ref}),$$

where $Q_{ref}$ represents a reference temperature inside the printer, and $\Delta Q$ represents a difference between the detected temperature Q and the reference temperature $Q_{ref}$, wherein the particular process further comprises:

calculating, for each of the first to N-th types of dots, the additional period of time $a_n$ given by:

$$a_n = \left\{T_n + \frac{\Delta Q \cdot f'_n(Q_{ref})}{P}\right\} - \left\{T_{n-1} + \frac{\Delta Q \cdot f'_{n-1}(Q_{ref})}{P}\right\}.$$

15. The non-transitory computer-readable medium according to claim 13, wherein when the correction period of time $X_n$ for the n-th type of dot according to the detected temperature Q is determined by a difference from a correction period of time $X_{ref}$ for a reference type of dot among the first to N-th types of dots according to the detected temperature Q, the heating period of time $A_n$ is given by a following particular expression:

$$A_n = T_A \sum_{k=1}^{n} a_k,$$

where $T_A$ represents a correction coefficient that is multiplied by a sum of the additional periods of time $a_1$ to $a_{ref}$ required to form the reference type of dot, in order to correct a dot formation condition of the reference type of dot in accordance with the detected temperature Q, and wherein the particular process further comprises:

setting the heating period of time $A_n$ given by the particular expression, for each dot included in the target line, in accordance with the print data.

16. The non-transitory computer-readable medium according to claim 11, wherein the printer further comprises a voltage detector configured to detect a voltage supplied to each heating element of the thermal head, wherein the condition value includes the voltage detected by the voltage detector.

17. The non-transitory computer-readable medium according to claim 16, wherein when the correction period of time $X_n$ for the n-th type of dot according to the detected voltage is determined by a difference from a correction period of time $X_{ref}$ for a reference type of dot among the first to N-th types of dots according to the detected voltage, the heating period of time $A_n$ is given by a following specific expression:

$$A_n = P_{ref} \sum_{k=1}^{n} a_k,$$

where $P_{ref}$ represents a correction coefficient that is multiplied by a sum of the additional periods of time $a_1$ to $a_{ref}$ required to form the reference type of dot, in order to correct a dot formation condition of the reference type of dot in accordance with the detected voltage, and wherein the particular process further comprises:

setting the heating period of time $A_n$ given by the specific expression, for each dot included in the target line, in accordance with the print data.

18. The non-transitory computer-readable medium according to claim 11, wherein the plurality of types of dots formable on the print medium are two types of dots.

* * * * *

UNITED STATES PATENT AND TRADEMARK OFFICE
CERTIFICATE OF CORRECTION

PATENT NO. : 10,183,499 B2
APPLICATION NO. : 15/699093
DATED : January 22, 2019
INVENTOR(S) : Akira Minami It is certified that error appears in the above-identified patent and that said Letters Patent is hereby corrected as shown below:

On the Title Page

Item (57) Abstract, Line 4:
Please delete "$(T_{n-1}X_{n-1})$," and insert --$(T_{n-1}+X_{n-1})$,--

Signed and Sealed this
Sixteenth Day of July, 2019

Andrei Iancu
*Director of the United States Patent and Trademark Office*